(12) United States Patent
Kim et al.

(10) Patent No.: US 11,348,585 B2
(45) Date of Patent: May 31, 2022

(54) ARTIFICIAL INTELLIGENCE APPARATUS

(71) Applicant: LG ELECTRONICS INC., Seoul (KR)

(72) Inventors: Sangwon Kim, Seoul (KR); Jaehoon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 176 days.

(21) Appl. No.: 16/789,329

(22) Filed: Feb. 12, 2020

(65) Prior Publication Data

US 2021/0142806 A1  May 13, 2021

(30) Foreign Application Priority Data

Nov. 12, 2019  (KR) ........................ 10-2019-0144267

(51) Int. Cl.
*G10L 15/26* (2006.01)
*B67D 1/00* (2006.01)
(Continued)

(52) U.S. Cl.
CPC ............ *G10L 15/26* (2013.01); *B67D 1/0008* (2013.01); *G10L 15/05* (2013.01); *G10L 15/063* (2013.01);
(Continued)

(58) Field of Classification Search
CPC ......... G10L 15/22; G10L 15/26; G10L 15/20; G10L 2015/223; G10L 15/05; G10L 15/063; G10L 15/16; B67D 1/0014; B67D 1/0888; B67D 1/0894; B67D 2210/0001; B67D 1/0009; B67D 1/0008
(Continued)

(56) References Cited

U.S. PATENT DOCUMENTS 5,889,684 A  *  3/1999  Ben-David ........... B67D 1/0014
                                                   700/282
6,405,939 B1 *  6/2002  Mazzenga ............... B05B 12/00
                                                   239/67
(Continued)

FOREIGN PATENT DOCUMENTS

KR     1020190092327      8/2019
WO        2018199421     11/2018

OTHER PUBLICATIONS

European Patent Office Application Serial No. 20185202.7, Search Report dated Dec. 22, 2020, 9 pages.

*Primary Examiner* — Vijay B Chawan
(74) *Attorney, Agent, or Firm* — Lee, Hong, Degerman, Kang & Waimey PC

(57) ABSTRACT

Disclosed herein are an artificial intelligence apparatus and a method of operating the same. The artificial intelligence apparatus includes one or more processors that obtain weight data of a container and speech data, determines whether the container is seated on a seating portion of a water dispensing apparatus using the weight data, adjusts a speech recognition sensitivity according to whether the container is seated on the seating portion, inputs the first speech data to a speech recognition model and allows the water dispensing apparatus to perform a first water dispensing operation corresponding to first water dispensing information when the speech recognition model outputs the first water dispensing information based on the first speech data.

16 Claims, 10 Drawing Sheets

(51) Int. Cl.
    *G10L 15/05*      (2013.01)
    *G10L 15/06*      (2013.01)
    *G10L 15/16*      (2006.01)
    *G10L 15/08*      (2006.01)

(52) U.S. Cl.
    CPC ........ *G10L 15/16* (2013.01); *G10L 2015/088* (2013.01)

(58) Field of Classification Search
    USPC ..................................... 704/275, 270, 270.1
    See application file for complete search history.

(56) References Cited

U.S. PATENT DOCUMENTS

| | | | | |
|---|---|---|---|---|
| 6,510,416 B1* | 1/2003 | Lad | ...................... | B67D 7/0401 141/231 |
| 7,979,156 B2* | 7/2011 | Ochi | ........................ | G07F 9/02 700/240 |
| 8,335,586 B2* | 12/2012 | Ochi | ........................ | G07F 9/02 700/232 |
| 8,572,772 B2* | 11/2013 | Wolf | ........................ | E03C 1/057 4/623 |
| 2009/0056011 A1* | 3/2009 | Wolf | ........................ | E03C 1/057 4/623 |
| 2014/0077946 A1* | 3/2014 | Tran | ..................... | A61B 5/0006 340/539.13 |
| 2015/0336786 A1* | 11/2015 | Gardner | .................... | F24C 7/08 222/1 |
| 2019/0377973 A1* | 12/2019 | Jin | ........................ | B67D 1/0014 |
| 2020/0039808 A1* | 2/2020 | Jeong | ...................... | G10L 15/22 |
| 2020/0354932 A1* | 11/2020 | Gunawardena | ...... | G05B 19/416 |

\* cited by examiner

ARTIFICIAL INTELLIGENCE APPARATUS

CROSS-REFERENCE TO RELATED APPLICATIONS

Pursuant to 35 U.S.C. § 119(a), this application claims the benefit of earlier filing date and right of priority to Korean Patent Application No. 10-2019-0144267, filed on Nov. 12, 2019, the contents of which are all hereby incorporated by reference herein in their entirety.

BACKGROUND OF THE INVENTION

1. Field of the Invention

The present disclosure relates to an artificial intelligence apparatus mounted in a water dispensing apparatus, and in particular, to an artificial intelligence apparatus that obtains weight data of a container, determines whether the container is seated on the water dispensing apparatus based on the weight data of the container, and adjusts a speech recognition sensitivity.

In addition, the present disclosure relates to a customized water dispensing apparatus by training an artificial intelligence model using usage history information.

2. Discussion of the Related Art

Recently, with the development of speech recognition technology and Internet of Thing (IoT) technology, apparatuses used in spaces such as homes and offices can also perform operations through speech recognition. Due to this, speech recognition technology has been applied to apparatuses such as water purifiers that perform a water dispensing operation. Water dispensing apparatuses include a water purifier or a coffee machine, and a conventional water purifier provides a function of dispensing water of which the water temperature and water dispensing amount are adjusted according to a user's command through speech recognition.

However, the conventional water purifier may malfunction because a noise is mixed in a speech command spoken by the user due to noise occurring in a surrounding environment or a similar speech is incorrectly recognized. Therefore, the speech recognition is activated through the start word to increase the accuracy of the speech recognition.

SUMMARY OF THE INVENTION

An object of the present disclosure is to prevent misrecognition of the speech recognition function by determining whether a container is seated on a water dispensing apparatus and adjusting a speech recognition sensitivity.

In addition, another object of the present disclosure is to provide a customized water dispensing apparatus by training an artificial intelligence model using usage history information.

The present disclosure discloses an artificial intelligence apparatus including a processor that determines whether a container is seated on a seating portion of a water dispensing apparatus using the weight data of the container, adjusts a speech recognition sensitivity of a speech processing model according to whether the container is seated on the seating portion, and inputs the speech data to the speech processing model.

In addition, the present disclosure discloses a customized water dispensing apparatus by training an artificial intelligence model using usage history information.

DETAILED DESCRIPTION OF THE PREFERRED EMBODIMENTS

Figure 1:
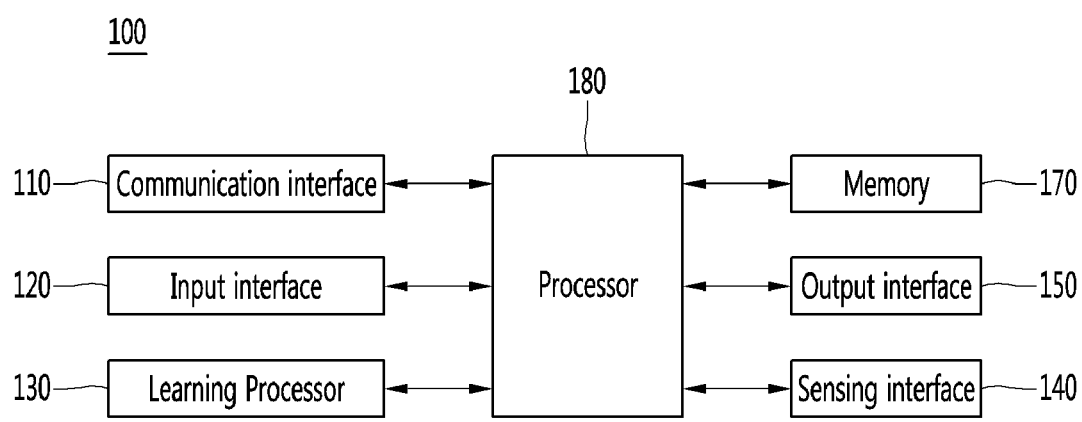
FIG. 1 is a block diagram illustrating an AI apparatus according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "interface" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving interface may include an actuator or a motor and may perform various physical operations such as moving a robot joint. In addition, a movable robot may include a wheel, a brake, a propeller, and the like in a driving interface, and may travel on the ground through the driving interface or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present disclosure.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication interface 110, an input interface 120, a learning processor 130, a sensing interface 140, an output interface 150, a memory 170, and a processor 180.

The communication interface 110 may transmit and receive data to and from external devices such as other 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

Here, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a training data for model learning and an input data to be used when an output is acquired by using learning model. The input interface 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing interface 140 may acquire at least one of internal information about the AI apparatus 100, ambient environment information about the AI apparatus 100, and user information by using various sensors.

Examples of the sensors included in the sensing interface 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

Here, the output interface 150 may include a display interface for outputting time information, a speaker for outputting auditory information, and a haptic module for outputting haptic information.

The memory 170 may store data that supports various functions of the AI apparatus 100. For example, the memory 170 may store input data acquired by the input interface 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
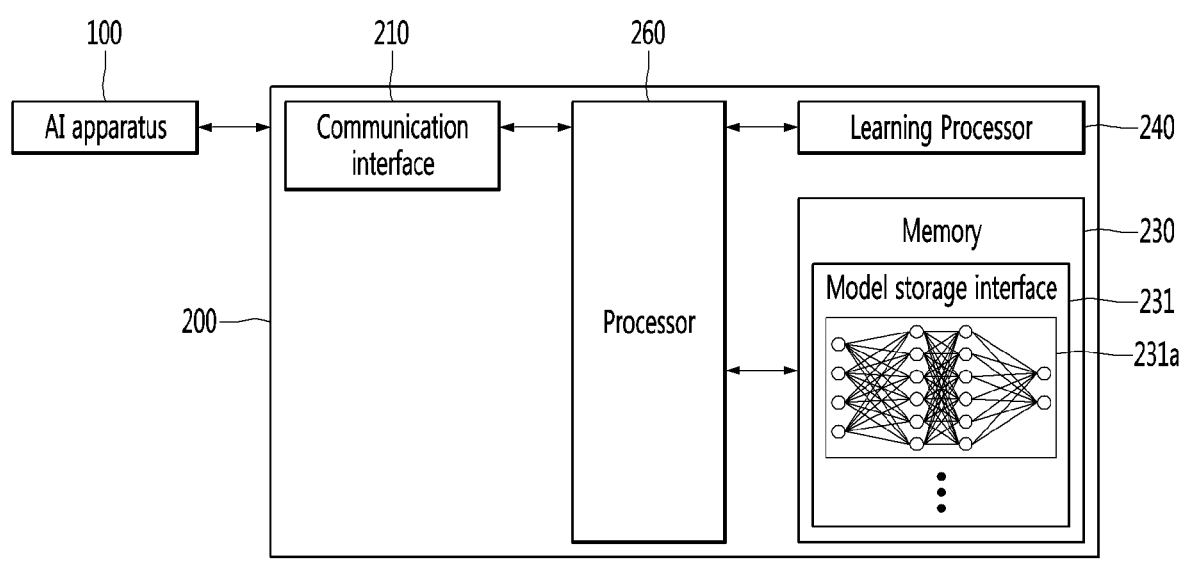
FIG. 2 is a block diagram illustrating an AI server according to an embodiment of the present disclosure.

FIG. 2 is a block diagram illustrating an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication interface 210, a memory 230, a learning processor 240, a processor 260, and the like.

The communication interface 210 can transmit and receive data to and from an external device such as the AI apparatus 100.

The memory 230 may include a model storage interface 231. The model storage interface 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
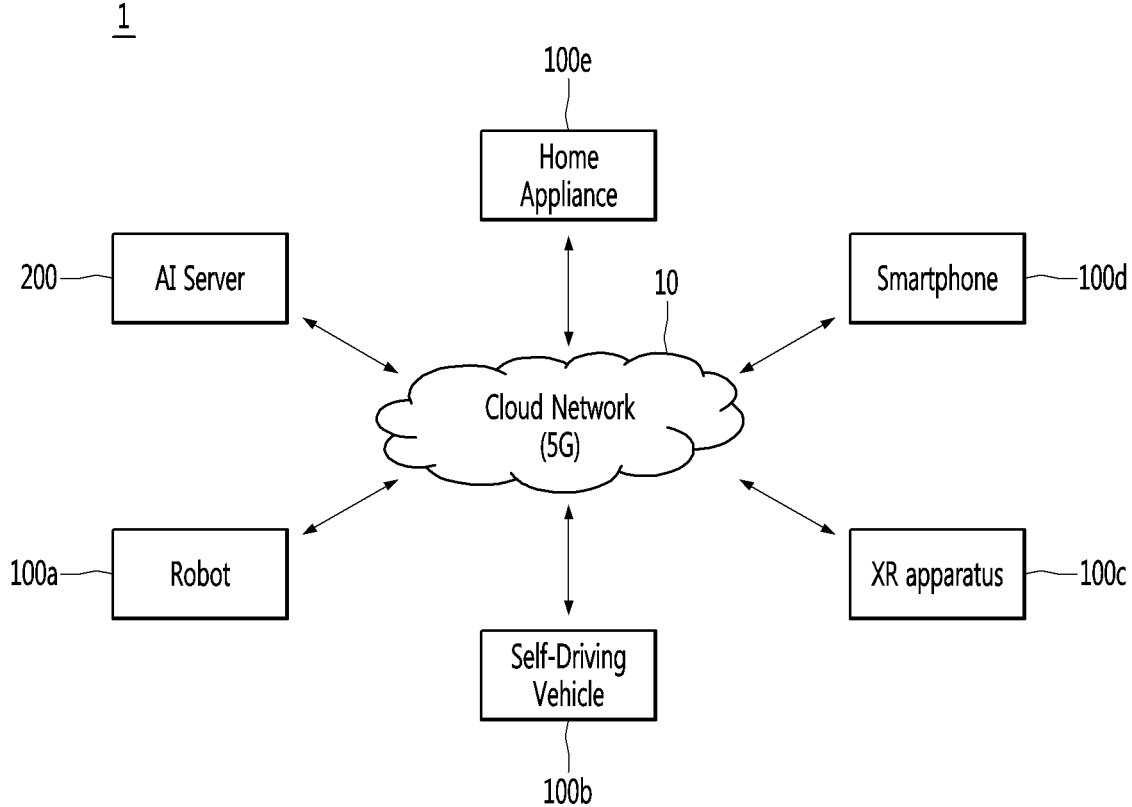
FIG. 3 is a view illustrating an AI system according to an embodiment of the present disclosure.

FIG. 3 is a view illustrating an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving interface such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving interface based on the control/interaction of the user. Here, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling route by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving interface such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving interface based on the control/interaction of the user. Here, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving interface of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
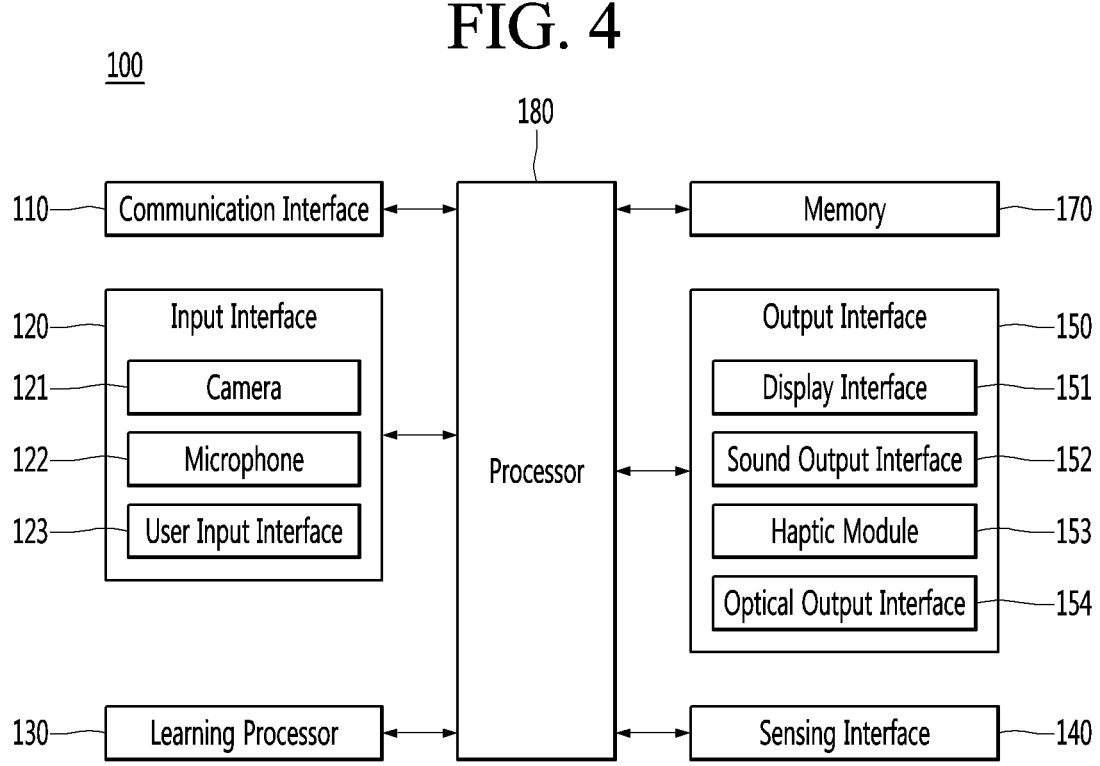
FIG. 4 is a block diagram illustrating an AI apparatus according to an embodiment of the present disclosure.

FIG. 4 is a block diagram illustrating an AI apparatus 100 according to an embodiment of the present disclosure.

The redundant repeat of FIG. 1 will be omitted below.

In the present disclosure, the AI apparatus 100 may include an edge device.

The communication interface 110 may also be referred to as a communicator.

Referring to FIG. 4, the input interface 120 may include a camera 121 for image signal input, a microphone 122 for receiving audio signal input, and a user input interface 123 for receiving information from a user.

Voice data or image data collected by the input interface 120 are analyzed and processed as a user's control command.

Then, the input interface 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display interface 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input interface 123 is to receive information from a user and when information is inputted through the user input interface 123, the processor 180 may control an operation of the AI apparatus 100 to correspond to the inputted information.

The user input interface 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensing interface 140 may also be referred to as a sensor interface.

The output interface 150 may include at least one of a display interface 151, a sound output module 152, a haptic module 153, or an optical output module 154.

The display interface 151 may display (output) information processed in the AI apparatus 100. For example, the display interface 151 may display execution screen information of an application program running on the AI apparatus 100 or user interface (UI) and graphic user interface (GUI) information according to such execution screen information.

The display interface 151 may be formed with a mutual layer structure with a touch sensor or formed integrally, so that a touch screen may be implemented. Such a touch screen may serve as the user input interface 123 providing an input interface between the AI apparatus 100 and a user, and an output interface between the AI apparatus 100 and a user at the same time.

The sound output module 152 may output audio data received from the wireless communication interface 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
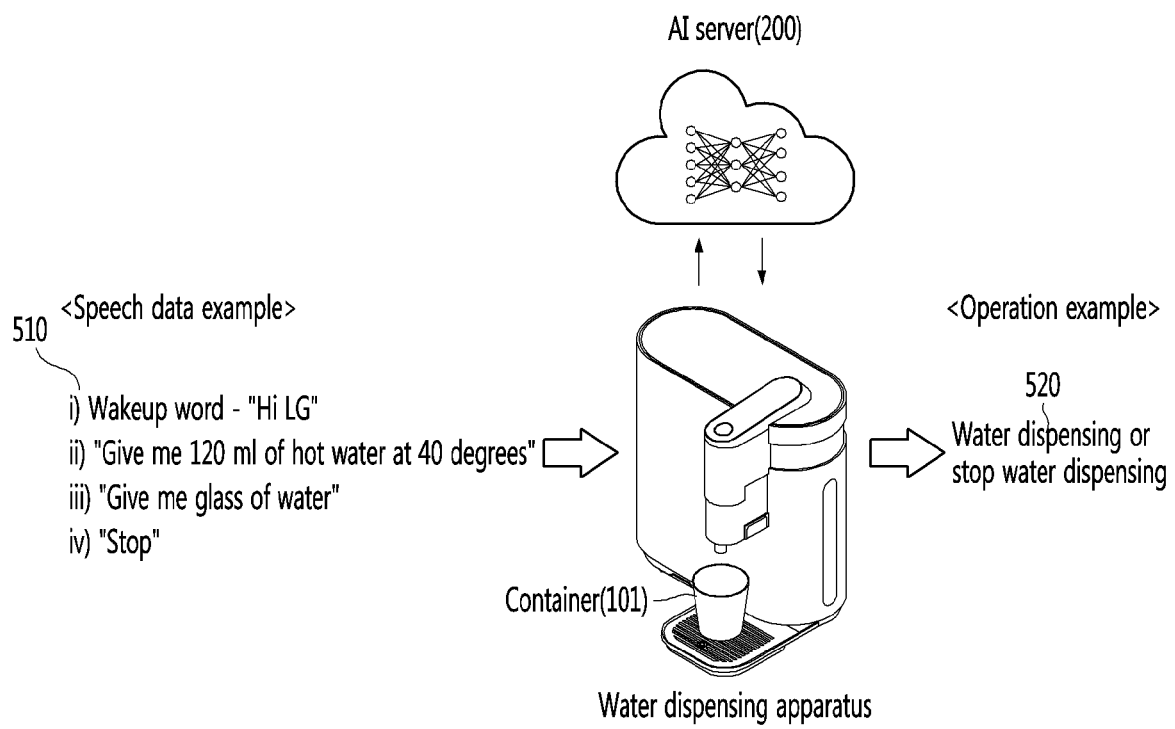
FIG. 5 is a view illustrating an example of speech recognition of a water dispensing apparatus.

FIG. 5 illustrates an example of speech recognition of a water dispensing apparatus.

Referring to FIG. 5, the speech utterance of the user with respect to the water dispensing apparatus may include the same case as 510 of FIG. 5.

Firstly, a start word for activating a speech recognition function may be input. In the present disclosure, a start word may include "HI, LG".

In addition, a user may receive a complete speech command for a water dispensing amount and a water temperature which are desired by a user. For example, a complete speech command may include the type, temperature, and dispensing amount of liquid being dispensed, such as "give me 120 ml of hot water".

In addition, the user may speak an incomplete speech command. For example, the incomplete speech command may include, for example, "give me a glass of hot water at 40 degrees" with either a temperature or a water dispensing amount omitted.

In addition, the user may speak simple water dispensing command. For example, the simple water dispensing command may not include a temperature and a water dispensing amount and may include something like "give me a glass of water."

In addition, there is a speech to stop water dispensing when the water dispensing which the user does not intend is performed. For example, it could include something like "stop".

In this case, the artificial intelligence apparatus 100 may receive speech data spoken by the user and allow the water dispensing apparatus to perform or stop the water dispensing according to the received speech. In addition, the water dispensing apparatus may be controlled to communicate with an external device and to perform water dispensing or to stop water dispensing using the speech data received from the communication interface 110 of the artificial intelligence apparatus 100.

The artificial intelligence apparatus 100 may communicate with an artificial intelligence server 200 and perform speech recognition together with the artificial intelligence server 200 when a large amount of speech data is received.

Hereinafter, a flowchart according to the present disclosure will be described with reference to FIG. 6.

Figure 6:
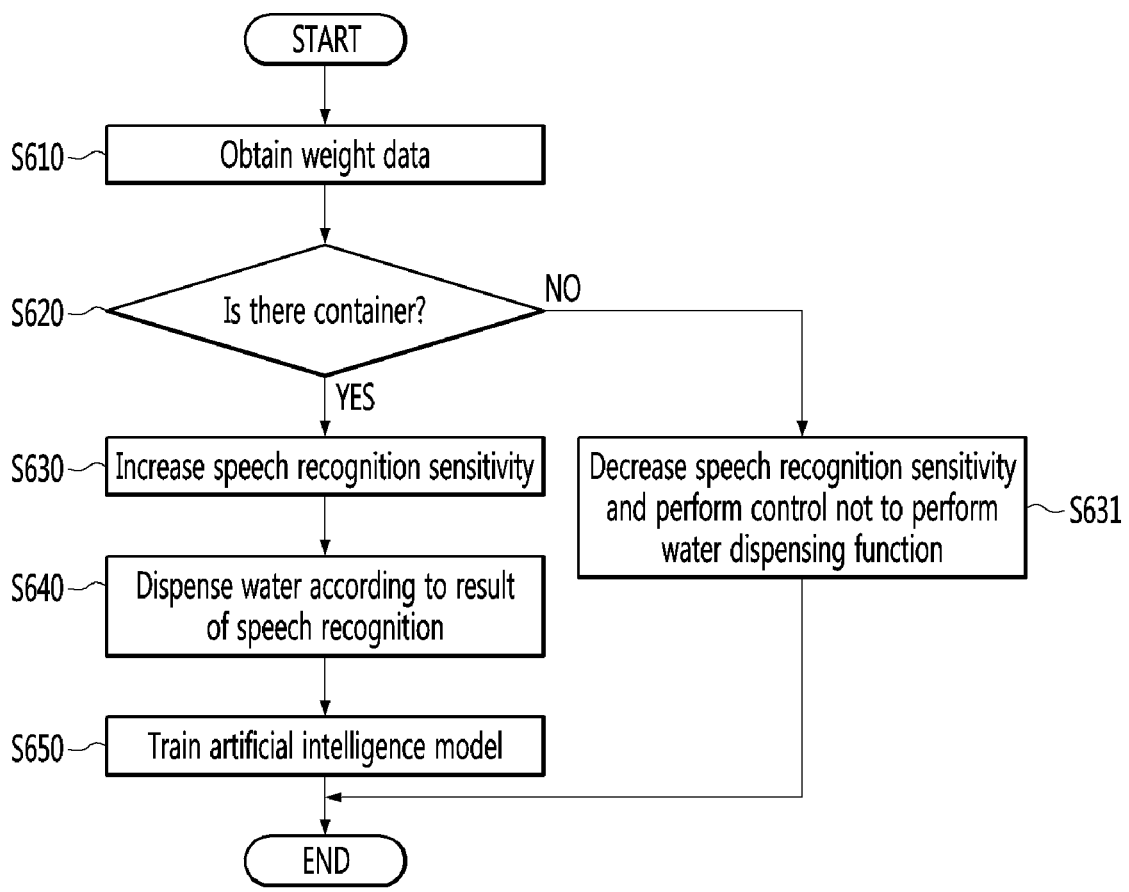
FIG. 6 is a view illustrating a flowchart of the present disclosure.

FIG. 6 illustrates a flowchart of the present disclosure.

Referring to FIG. 6, a sensing interface 140 of the artificial intelligence apparatus 100 according to the present disclosure may receive weight data of a container (S610). In this case, the sensing interface 140 may use a pressure sensor to receive the weight data of the container.

When the sensing interface 140 receives the weight data using the pressure sensor, the processor 180 may determine whether an environment suitable for performing speech recognition is provided.

In more detail, the processor 180 may determine whether the container is seated on the seating portion of the water dispensing apparatus using the weight data (S620). The processor 180 may adjust a speech recognition sensitivity according to whether the container is seated on the seating portion (S630 and S631).

More specifically, when it is determined that the container is seated on the seating portion of the water dispensing apparatus, the processor 180 may set the speech recognition sensitivity to a value higher than a sensitivity value in a case where the container is not seated on the seating portion (S630).

In addition, the processor 180 may set the speech recognition sensitivity to a value lower than a speech recognition sensitivity in a case where the container is seated on the seating portion or allow water dispensing apparatus not to perform a water dispensing function when it is determined that the container is not seated on the seating portion of the water dispensing apparatus.

According to the present disclosure, whether the container is seated on the seating portion of the water dispensing apparatus may be determined according to a value measured by the pressure sensor included in the sensing interface 140.

Specifically, when the weight data is greater than a first specific value or when an increase in the weight data within a preset period of time is greater than a second specific value, the processor 180 may determine that the container is seated on the seating portion of the water dispensing apparatus.

For example, it is assumed that a value measured by the pressure sensor included in the sensing interface 140 of the artificial intelligence apparatus 100 is 200 g.

In this case, when the first specific value that is a reference for determining whether the container is seated on the seating portion of the water dispensing apparatus is set to 100 g, the processor 180 may determine that the container is seated on the seating portion of the water dispensing apparatus because the value 200 g measured by the pressure sensor is greater than the first specific value 100 g.

As another example, when the increase in the pressure sensor value within a specific period of time in the pressure sensor is greater than the second specific value (for example, 150 g).

When the container is not seated, the pressure sensor value will be close to zero. When the container is seated on the seating portion and the pressure sensor indicates 200 g, the processor 180 may determine that the increase amount in the pressure sensor value within a specific period of time is greater than 150 g, and determine that the container is seated on the seating portion of the water dispensing apparatus.

The first specific value, the second specific value, and the specific period of time may be set in advance. In addition, the unit of the first specific value is not limited to the above example and may be set in various units capable of measuring pressure or weight.

According to the present disclosure, the processor 180 may adjust the speech recognition sensitivity according to whether the container is seated on the seating portion. In this case, the sensitivity may be a speech reception sensitivity of the microphone 122 that receives speech data.

Specifically, increasing the sensitivity may lead to an increase in the speech recognition rate. In addition, when the speech recognition sensitivity is reduced, the speech recognition rate may decrease because the input interface 120 of the artificial intelligence apparatus 100 recognizes only user speech more reliably.

Adjusting the speech recognition sensitivity according to the present disclosure may include increasing the sensitivity of the speech recognition by controlling a sensitivity parameter for speech recognition.

In this case, changing the sensitivity parameter high may include enabling a smaller sound to be received. The sensitivity parameter may be appropriately set for each device that performs speech recognition.

In detail, changing the sensitivity parameter in the speech recognition model may be an indicator representing to what extent a similarity between pieces of information is determined in the case of comparing the frequency spectrum information of the speech recognition model stored in the memory 170 of the artificial intelligence apparatus 100 with the frequency spectrum information converted from the received speech data. As the speech recognition sensitivity becomes higher, a reference for determining the similarity of the frequency spectrum information may be lowered.

According to the present disclosure, after adjusting the sensitivity, the processor 180 may determine whether to input the first speech data into a speech recognition model. Hereinafter, operations according to a result of the sensitivity adjustment will be described.

Firstly, when it is determined that the container is seated on the seating portion of the water dispensing apparatus, the processor 180 may set the speech recognition sensitivity to a value higher than a sensitivity value in a case where the container is not seated on the seating portion (630). Thereafter, the first speech data may be input to a speech recognition model.

According to the present disclosure, the processor 180 may allow the water dispensing apparatus to perform a first water dispensing operation corresponding to first water dispensing information when the speech recognition model outputs the first water dispensing information based on the first speech data (S640).

In this case, the speech recognition model may include a speech recognition model that preprocesses the first speech data obtained by the input interface 120, extracts a feature vector of a speech command, and recognizes the speech command corresponding to the first speech data. The speech command corresponding to the first speech data may be used interchangeably with the first water dispensing information.

In addition, the processor 180 may obtain water dispensing information corresponding to the speech command (word or sentence) output by the speech recognition model and allow the water dispensing apparatus to dispense water according to the water dispensing information.

Secondly, according to the present disclosure, the processor 180 may set the speech recognition sensitivity to a value lower than a speech recognition sensitivity in a case where the container is seated on the seating portion or allow water dispensing apparatus not to perform a water dispensing function when it is determined that the container is not seated on the seating portion of the water dispensing apparatus (S631).

Hereinafter, a process after the speech recognition sensitivity is increased when it is determined that the container is seated on the seating portion will be described.

According to the present disclosure, the processor 180 may obtain first water dispensing information as a result of the speech recognition according to S640 and allow the water dispensing apparatus to perform the first water dispensing operation according to the first water dispensing information. Thereafter, the processor 180 may set the first speech data input to the speech recognition model and the first water dispensing information that is a result of the speech recognition as the usage history information and store the usage history information in the memory 170.

The processor 180 may train the artificial intelligence model using the usage history information stored in the memory 170 (S650).

According to the present disclosure, the processor 180 may train an artificial intelligence model using, as an input value, at least one of the first speech data or the weight data and using, as a result value, first water dispensing information output by the speech recognition model based on the first speech data (S650).

Specifically, a method of training the artificial intelligence model may be divided as the following.

Firstly, the processor 180 may identify a speaker by using the frequency characteristics of received speech data and train a first artificial intelligence model to output water dispensing information according to the usage history of the identified speaker.

Specifically, when the 'first speech data' included in the usage history information is input to the first artificial intelligence model, the processor 180 may train the first artificial intelligence model to output the first water dispensing information, which is a result of the speech recognition for the first speech data, as a result value.

For example, it is assumed that the received first speech data is "dispense 120 ml of water at 40 degrees". The processor 180 may obtain first water dispensing information (water of 40 degrees and 120 ml) by inputting the first speech data into a speech recognition model. In addition, the processor 180 may allow the water dispensing apparatus to dispense 120 ml of water at 40 degrees. The usage history information according to the first speech data may be stored in the memory 170.

The processor 180 may obtain the first water dispensing information (water of 40 degrees and 120 ml) using the usage history information stored in the memory 170 and extract first speaker feature data extracted from the first speech data. Thereafter, when the first speaker feature data is input to the first artificial intelligence model, the processor 180 may train the first artificial intelligence model to output the first water dispensing information.

Meanwhile, according to the present disclosure, the first speech data may be used as an input value of the artificial intelligence model without preprocessing the first speech data.

The artificial intelligence model trained using the speaker feature data according to the present disclosure may output second water dispensing information corresponding to a specific speaker as a result value when the second speech data spoken by the specific speaker is input thereto.

Secondly, the processor 180 may train a second artificial intelligence model to identify a speaker by using the frequency characteristics of the received speech data and output the water dispensing information corresponding to the speaker's usage history according to the weight data of a container.

In detail, when the first speech data and the weight data included in the usage history information are input to the second artificial intelligence model, the processor 180 may train the second artificial intelligence model to output first water dispensing information, which is a result of the speech recognition of the first speech data, as a result value.

For example, it is assumed that the received first speech data is "dispense 120 ml of water at 40 degrees". The processor 180 may obtain first water dispensing information (water of 40 degrees and 120 ml) by inputting the first speech data into a speech recognition model. The processor 180 may allow the water dispensing apparatus to dispense 120 ml of water at 40 degrees. The usage history information according to the first speech data may be stored in the memory 170. In this case, the usage history information may further include the weight data of the container and may be stored in the memory 170.

According to the present disclosure, the processor 180 may obtain first speaker feature data extracted from the first speech data.

Similarly, the speaker feature data is resulted from preprocessing of the first speech data and may be data including frequency characteristics for identifying the speaker of the first speech data. When the first speaker feature data and the weight data of the container which are extracted from the first speech data are input to the second artificial intelligence model, the processor 180 may train the second artificial intelligence model to output first water dispensing information (water of 40 degrees and 120 ml) stored in the usage history information as a result of the artificial intelligence model.

Meanwhile, the first speech data may be used as an input value of the artificial intelligence model without preprocessing the first speech data.

The second artificial intelligence model which is trained using the speaker feature data and the weigh data according to the present disclosure may receive second speech data spoken by a specific speaker through the input interface, obtain second weight data of a second container seated on the seating portion through the sensing interface, and output second water dispensing information corresponding to the specific speaker and the second container as a result value by inputting the second speech data spoken by the specific speaker and the second weight data of the second container into the trained artificial intelligence model.

In addition, unlike the method described above, a method of identifying the speaker may include identifying a user by detecting an instantaneous change magnitude in the weight data when the container is placed on the seating portion of the water dispensing apparatus.

Thirdly, the processor may train a third artificial intelligence model to output water dispensing information corresponding to speech feature data extracted from the received speech data and the weight data of the container.

In detail, when the first speech data and the weight data included in the usage history information are input to the third artificial intelligence model, the processor 180 may train the third artificial intelligence model to output first water dispensing information, which is a result of the speech recognition of the first speech data.

For example, it is assumed that the received first speech data is "dispense 120 ml of water at 40 degrees". The processor 180 may obtain first water dispensing information (water of 40 degrees and 120 ml) by inputting the first speech data into a speech recognition model. The processor 180 may allow the water dispensing apparatus to dispense 120 ml of water at 40 degrees.

The usage history information according to the first speech data may be stored in the memory 170. In this case, the usage history information may further include the weight data of the container and may be stored in the memory 170.

According to the present disclosure, the third artificial intelligence model trained using the speech feature data and the weight data may output a command extracted from the second speech data and 'second water dispensing information' corresponding to the second weight data as a result value when the second speech data and the second weight data are input thereto.

In this case, the command extracted from the speech data may be obtained by preprocessing the first speech data, and may be data obtained by detecting only a speech part spoken by an actual speaker and extracting information capable of representing the characteristics of a speech signal. For example, the command may include information capable of representing a word or sentence detected by reflecting the shape of a mouth or the position of a tongue according to a waveform to which the speech signal belongs.

Meanwhile, the first speech data may be used as an input value of the artificial intelligence model without preprocessing the first speech data. The third artificial intelligence model may further include the weight data as an input value, thereby improving accuracy of speech recognition than conventional speech recognition models.

Hereinafter, common contents according to the present disclosure will be described.

The 'water dispensing information' according to received speech data in the present disclosure may be used interchangeably with the 'information on the container', and the water dispensing information stored in the usage history information may also be used interchangeably with the information on the container.

In addition, the "water dispensing information" output by an artificial intelligence model may be used interchangeably with "information on the container according to the weight data of the container", and the information on the container and the water dispensing information may match with each other through a matching table.

In addition, the learning process of the artificial intelligence model may be performed in the artificial intelligence apparatus 100 and may be performed together in the artificial intelligence server 200.

That is, the processor 180 may collect usage history information including the operation contents of the AI apparatus 100 or the user's feedback on the operation and may store the collected usage history information in the memory 170 or the learning processor 130 or transmit the collected history information to the external device such as the AI server 200. The collected history information may be used to update a learning model.

Hereinafter, the usage of the artificial intelligence model trained in FIG. 7 will be described.

Figure 7:
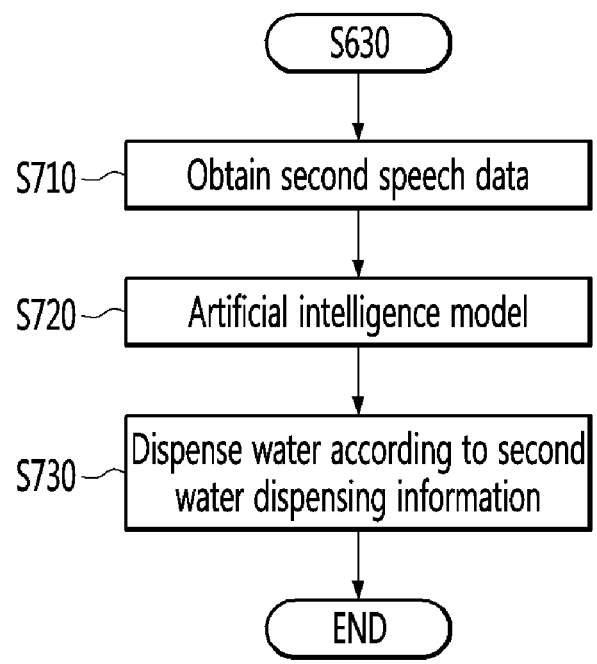
FIG. 7 is a view illustrating a flowchart of the present disclosure.

FIG. 7 illustrates a flowchart of the present disclosure.

Referring to FIG. 7, there is shown a flowchart when speech data by a specific speaker is received using the artificial intelligence model trained in S650 of FIG. 6.

The sensing interface 140 of the artificial intelligence apparatus 100 according to the present disclosure may obtain second weight data according to a second container. When the processor 180 determines that the container exists in the seating portion of the water dispensing apparatus, the processor 180 may increase a speech recognition sensitivity (S630). Thereafter, the input interface 120 of the artificial intelligence apparatus 100 may receive second speech data (S710).

The processor 180 may input the second speech data to the trained first artificial intelligence model (S720), obtain second water dispensing information as a result value, and allow the water dispensing apparatus to dispense water according to the second water dispensing information (S730).

In this case, the first artificial intelligence model trained using the speaker feature data according to the present disclosure may output second water dispensing information corresponding to a specific speaker as a result value when the second speech data spoken by the specific speaker is input thereto.

In addition, the processor 180 may input the second speech data and the second weight data to the trained second artificial intelligence model (S720) to obtain second water dispensing information as a result value, and allow the water dispensing apparatus to dispense water according to the second water dispending information (S730).

In this case, the second artificial intelligence model trained using the speaker feature data and the weight data according to the present disclosure may receive second speech data spoken by a specific speaker through the input interface, obtain second weight data of a second container seated on the seating portion through the sensing interface, and output second water dispensing information corresponding to the specific speaker and the second container as a result value by inputting the second speech data spoken by the specific speaker and the second weight data of the second container into the trained artificial intelligence model.

In addition, the processor 180 may input the second speech data and the second weight data to the trained third artificial intelligence model (S720) to obtain second water dispensing information as a result value, and allow the water dispensing apparatus to dispense water according to the second water dispending information (S730).

In this case, according to the present disclosure, the third artificial intelligence model trained using the speech feature data and the weight data may output a command extracted from the second speech data and 'second water dispensing information' corresponding to the second weight data as a result value when the second speech data and the second weight data are input thereto.

In addition, the artificial intelligence model according to the present disclosure may include a fourth artificial intelligence model trained to output water dispensing information (water dispensing amount and temperature) when the weight data of a container is sensed using usage history information when no speech data is received. In this case, when the artificial intelligence model determines a cup included in the usage history information, the artificial intelligence model may dispense water with a specific water dispensing amount/water temperature matched therewith.

For example, when the artificial intelligence model is trained using the usage history information indicating dispensing of water of '120 ml and 40 degrees' with a cup of g, the processor 180 may allow the water dispensing apparatus to dispense water of 120 ml/40 degrees when the cup of 30 g is seated on the seating portion of the water dispensing apparatus.

Figure 8:
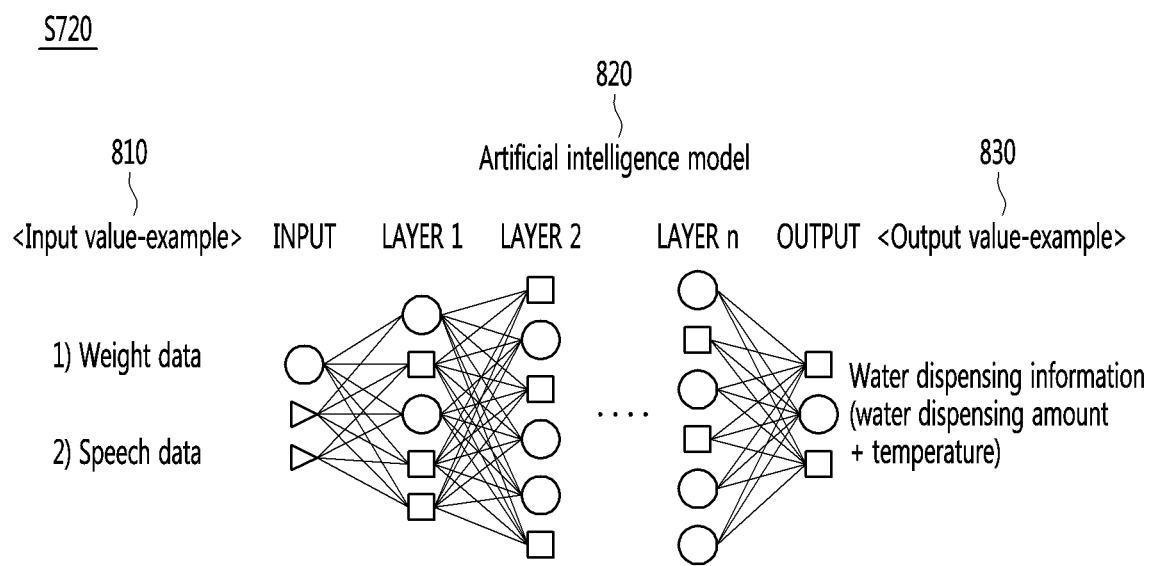
FIG. 8 is a view illustrating an artificial intelligence model of the present disclosure.

FIG. 8 illustrates an artificial intelligence model of the present disclosure.

Referring to FIG. 8, the artificial intelligence model according to the present disclosure may use, as an input value, at least one of the first speech data or the weight data and output, as a result value, first water dispensing information output by a speech recognition model based on the first speech data.

In detail, the first artificial intelligence model of the present disclosure may include an artificial neural network 820 that outputs water dispensing information including a water dispensing amount and a temperature as a result value 830 when speech data is input as an input value 810. The speech data may include a feature for identifying a speaker using frequency characteristics of received speech data.

In addition, the second artificial intelligence model of the present disclosure may include an artificial neural network 820 that outputs water dispensing information including 'water dispensing amount and temperature' as the result value 830 when 'weight data' and 'speech data' are input as the input value 810. Similarly, the speech data may include a feature for identifying a speaker using frequency characteristics of received speech data.

In addition, the third artificial intelligence model of the present disclosure may include an artificial neural network 820 that outputs water dispensing information including 'water dispensing amount and temperature' as the result value 830 when 'weight data' and 'speech data' are input as the input value 810. The speech data may include speech feature data for recognizing a speech command (word or sentence).

In addition, a fourth artificial intelligence model of the present disclosure may include an artificial neural network 820 that outputs water dispensing information including a water dispensing amount and a temperature as the result value 830 when weight data is input as the input value 810.

In addition, the water dispensing information may be used interchangeably with container information (for example, Cup A, Cup B).

In this case, the artificial neural network may include a neural network as shown in the drawings and may be implemented in various models to process sequence data.

In addition, the artificial neural network may also include a classifier used in speech recognition. The artificial intelligence model may include logistic regressions, support vector machines (SVM), decision trees, a random forest, neural networks, and the like as a classifier. It is not limited to the example mentioned.

Figure 9:
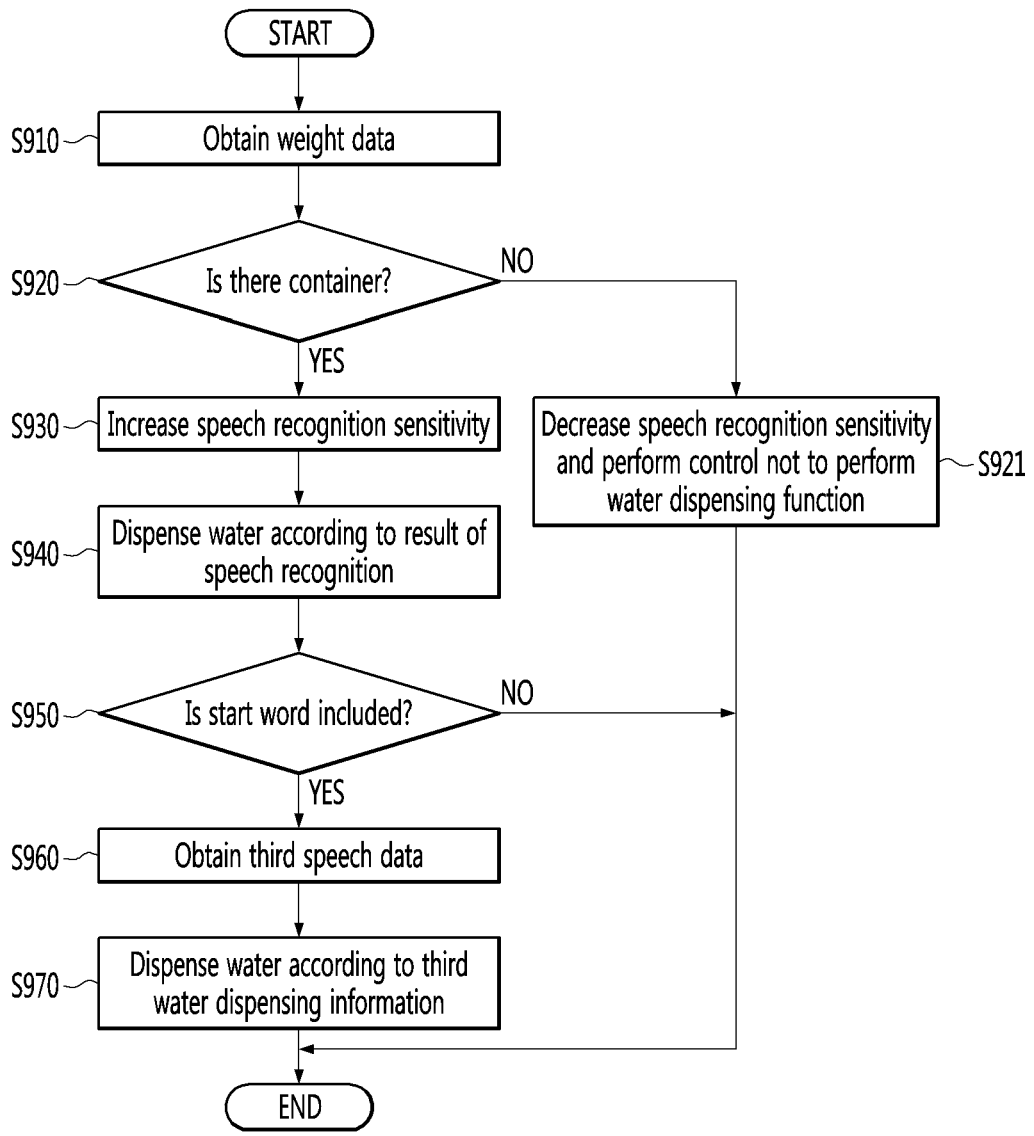
FIG. 9 is a view illustrating a flowchart of the present disclosure.

FIG. 9 illustrates a flowchart of the present disclosure.

Referring to FIG. 9, the sensing interface 140 of the artificial intelligence apparatus may receive weight data of a container placed on a seating portion of the water dispensing apparatus (S910). The processor 180 may determine that the container has been seated on the seating portion when the weight data is greater than or equal to a first value or an increase in the weight data within a preset period of time is greater than or equal to a second value (S920).

If the processor 180 determines that the container is properly seated in the water extraction device, the processor 180 may increase the speech recognition sensitivity (S930). Thereafter, when the first voice data is received, the processor 180 inputs the first voice data to the voice recognition model and performs the first water extraction according to the voice recognition result by using the first water extraction information derived as a result of the voice recognition. It may be controlled (S940).

In addition, when a user's usage history information is accumulated, the speech recognition models of steps S930 and S940 may be used together with an artificial intelligence model.

According to the present disclosure, the processor 180 may allow the water dispensing apparatus to perform a first water dispensing operation corresponding to first water dispensing information when the speech recognition model outputs the first water dispensing information based on the first speech data.

Thereafter, the processor 180 may determine whether a start word is received before the first speech data after performing the first water dispensing operation according to the first speech data (S950).

When the processor 180 determines that the start word has been received, the processor 180 may receive third speech data within a specific period of time after the first water dispensing operation.

When the third speech data is received within the specific period of time after the first water dispensing operation (S960), the processor 180 may obtain third water dispensing information by inputting the third speech data into a speech recognition model or an artificial intelligence model and allow the water dispensing apparatus to dispense water according to the third water dispensing information (S970).

On the other hand, the processor 180 may perform S950 of determining whether the start word is received before the first speech data before the first water dispensing operation is performed, and the step of determining whether the start word is included may be omitted.

Hereinafter, specific examples will be described with reference to FIG. 10.

Figure 10:
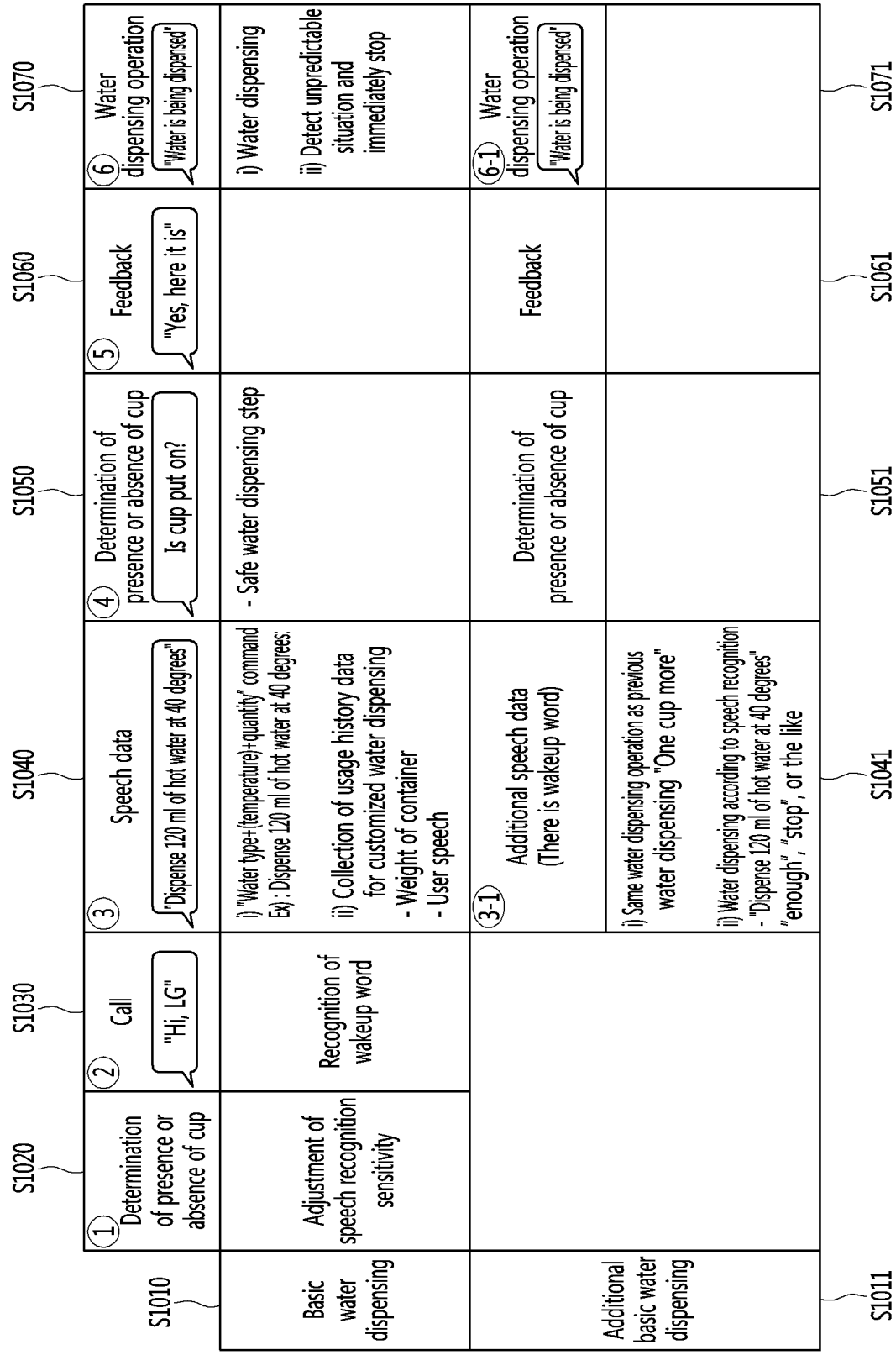
FIG. 10 is a view illustrating a scenario of the present disclosure.

FIG. 10 illustrates a scenario of the present disclosure.

Referring to FIG. 10, there is illustrated a scenario in which a start word is included in speech data received to control a water dispensing apparatus. In this case, the start word may mean a specific speech command for activating a speech recognition function for performing speech recognition.

According to the present disclosure, a user may place a container for water dispensing on a seating portion of the water dispensing apparatus for basic water dispensing (S1010). When it is determined that the weight data is greater than or equal to a first value using first weight data of the container, the processor 180 may increase a speech recognition sensitivity (S1020). In this case, the processor 180 may provide a notification indicating that the speech recognition sensitivity is increased to a user by controlling an output interface of the artificial intelligence apparatus.

According to the present disclosure, the user may recognize that the speech recognition sensitivity is increased and speak a start word ("hi lg") for the water dispensing command through speech (S1030). The processor 180 of the artificial intelligence apparatus 100 may receive the start word and activate a speech recognition function.

When the speech recognition function is activated, the input interface 120 of the artificial intelligence apparatus 100 may receive first speech data (S1040).

Specifically, the first speech data may include a complete speech command, an incomplete speech command, or a simple speech command.

In this case, the complete speech command may mean a speech including a water dispensing amount and a temperature and may include an example such as "dispense 120 ml of hot water at 40 degrees". When the complete speech command is received, the processor 180 may obtain the first water dispensing information based on the complete speech command by inputting the complete speech command to a speech recognition model and allow the water dispensing apparatus to perform a first water dispensing operation according to the first water dispensing information.

In addition, when there is the same water dispensing operation in the past according to the usage history information, the processor 180 may input a complete speech command and first weight data into an artificial intelligence model to obtain first water dispensing information based on the complete voice command, and allow the water dispensing apparatus to perform a first water dispensing operation according to the water dispensing information.

Secondly, an incomplete speech command may mean a speech in which either a water dispensing amount or a temperature is omitted and may include examples such as "dispense 120 ml of water" or "give me water at 40 degrees". When the incomplete speech command is received, the processor 180 may obtain the first water dispensing information based on the incomplete speech command by inputting the incomplete speech command to a speech recognition model and allow the water dispensing apparatus to perform a first water dispensing operation according to the first water dispensing information.

In this case, the processor 180 may replace information which is not obtained among the water dispensing amount or the temperature with a preset value according to the speech recognition of the incomplete speech command. In addition, In addition, when there is the same water dispensing operation in the past according to the usage history information, the processor 180 may input an incomplete speech command and first weight data into an artificial intelligence model according to FIG. 8 to obtain first water dispensing information based on the incomplete voice command, and allow the water dispensing apparatus to perform a first water dispensing operation according to the water dispensing information.

Thirdly, a simple speech command may mean a speech in which a water dispensing amount and a temperature both are omitted and may include an example such as "give me a glass of water".

When the simple speech command is received, the processor 180 may input the simple speech command into the trained artificial intelligence model according to the usage history. The artificial intelligence model may obtain first water dispensing information based on speaker feature data extracted from the first speech data and allow the water dispending apparatus to perform a first water dispensing operation based on the first water dispensing information.

In addition, the processor 180 may input the 'simple speech command' and the 'first weight data' to the artificial intelligence model according to FIG. 8 to obtain first water dispensing information based on the simple speech command and allow the water dispensing apparatus to perform the first water dispensing operation according to the water dispensing information.

On the other hand, the usage of the artificial intelligence model or the speech recognition model according to the type of a speech as described above is merely an example and may be used together or replaced depending on weights assigned to each model or a use environment.

According to the present disclosure, when receiving the first speech data, the processor 180 may determine whether a container is properly seated on the water dispensing apparatus (S1050). In addition, the processor 180 may request feedback from a user to identify whether the container is properly seated on the water dispensing apparatus (S1060).

S1050 and S1060 may be safe water dispensing steps to prevent water to be dispensed when the container is properly not seated, the steps may be omitted and the water dispensing command may be performed immediately.

According to the present disclosure, the processor 180 may allow the water dispensing apparatus to the first water dispensing operation according to the first water dispensing information (S1070). When it is determined that a start word (e.g., "Hi LG") is received before the first speech data after the first water operation is performed, the processor 180 may continuously receive third speech data without calling a separate start word during a specific period of time after the completion of the first water dispensing operation and allow the water dispensing apparatus to perform a water dispensing operation according to the third speech data.

For example, it is assumed that a speech received initially is "Hi LG!, dispense 120 ml of hot water at 40 degrees". The processor 180 may allow the water dispensing apparatus to perform the first water dispensing operation based on the first speech data "dispense 120 ml of hot water at 40 degrees".

The processor 180 may further receive the third speech data for a specific period of time when the start word "Hi LG!" is received before the first speech data.

For example, when "one cup more" is spoken as the third speech data, the processor 180 may input the third speech data and the weight data into the trained artificial intelligence model to obtain third water dispensing information as a result value and allow the water dispensing apparatus to dispense water according to the third water dispensing information (S1041).

In this case, the artificial intelligence model may include a model trained to identify a speaker of the weight data of a container and the received speech data and output water dispensing information according to usage history information and the third speech data may include speaker feature data extracted from the "one cup more".

For example, when "one cup more" is received, the processor 180 may input the third speech data and the weight data of the container to the artificial intelligence model, and allow the water dispensing apparatus to perform the third water dispensing information ("120 ml of hot water at 40 degrees") output by the artificial intelligence model.

Other examples may include a case where a complete speech command is further received or a case where a water dispensing stop command ("enough" or "stop") for stopping a water dispensing operation is received.

According to the present disclosure, when receiving the third speech data, the processor 180 may determine whether a container is properly seated on the water dispensing apparatus (S1051). In addition, the processor may request feedback from a user to identify whether the container is properly seated on the water dispensing apparatus (S1061).

S1051 and S1061 may be safe water dispensing steps to prevent water to be dispensed when the container is properly not seated, the steps may be omitted and the water dispensing command may be performed immediately.

The processor 180 may allow the water dispensing apparatus to perform the third water dispensing operation according to the third water dispensing information after the safe water dispensing step (S1071).

According to the present disclosure, a method of operating an artificial intelligence apparatus mounted in a water dispensing apparatus, includes obtaining weight data of a container, determining whether the container is seated on a seating portion of the water dispensing apparatus using the weight data, adjusting a speech recognition sensitivity according to whether the container is seated on the seating portion, receiving first speech data; and inputting the first speech data to a speech recognition model and allowing the water dispensing apparatus to perform a first water dispensing operation corresponding to first water dispensing information when the speech recognition model outputs the first water dispensing information based on the first speech data.

Furthermore, the determining of whether the container is seated on the seating portion of the water supply apparatus using the weight data may include determining that the container is seated on the seating portion when the weight data is greater than or equal to a first value or an increase in the weight data within a preset period of time is greater than or equal to a second value.

Furthermore, the adjusting of the speech recognition sensitivity according to whether the container is seated on the seating portion may include setting the speech recognition sensitivity to a value higher than a speech recognition sensitivity in a case where the container is not seated on the seating portion when it is determined that the container is seated on the seating portion of the water dispensing apparatus.

Furthermore, the speech recognition sensitivity includes a reception sensitivity of a microphone receiving speech data or a frequency spectral similarity between received speech data and stored data of the speech recognition model.

Furthermore, the adjusting of the speech recognition sensitivity according to whether the container is seated on the seating portion may include setting the speech recognition sensitivity to be lower than a preset value or allow the water dispensing apparatus not to perform a water dispensing function when it is determined that the container is not seated on the seating portion of the water dispensing apparatus.

Furthermore, the method of operating the artificial intelligence apparatus may further include training an artificial intelligence model using, as an input value, at least one of the first speech data or the weight data and using, as a result value, first water dispensing information output by the speech recognition model based on the first speech data.

Furthermore, the method of operating the artificial intelligence apparatus may further include receiving second speech data spoken by a specific speaker through the input interface, obtaining second water dispensing information corresponding to the specific speaker as a result value by inputting the second speech data spoken by the specific speaker into the trained artificial intelligence model, and allowing the water dispensing apparatus to dispense water according to the second water dispensing information.

Furthermore, the method of operating the artificial intelligence apparatus may further include receiving second speech data spoken by a specific speaker through the input interface, obtain second weight data of a second container seated on the seating portion through the sensing interface, obtaining second water dispensing information corresponding to the specific speaker and the second container as a result value by inputting the second speech data spoken by the specific speaker and the second weight data of the second container into the trained artificial intelligence model, and allowing the water dispensing apparatus to dispense water according to the second water dispensing information.

Furthermore, the method of operating the artificial intelligence apparatus may further include obtaining second water dispensing information corresponding to an instruction extracted from the second speech data and the second weight data as a result value by inputting second speech data and second weight data into the trained artificial intelligence model and allowing the water extraction device to dispense water according to the second water dispensing information.

Furthermore, the method of operating the artificial intelligence apparatus may further include, when a start word is received before the first speech data, allowing the water dispensing apparatus to perform the first water dispensing operation corresponding to first water dispensing information when the speech recognition model outputs the first water dispensing information based on the first speech data, and obtaining third water dispensing information by inputting third speed data into the speech recognition model or the artificial intelligence model and allowing the water dispensing apparatus to perform a water dispensing operation according to the third water dispensing information.

The artificial intelligence device according to the present disclosure may determine whether a container is seated on the water dispensing apparatus, and when the container is seated on the water dispensing apparatus, set the speech recognition sensitivity to be higher than a set value to prevent malfunction of the speech recognition.

In addition, the artificial intelligence device according to the present disclosure may train the artificial intelligence model using the usage history information to provide convenience through a personalized water dispensing function.

The present disclosure may include one or more processors. The one or more processors may include 'the processor 180' or 'a processor for operating an artificial intelligence model'.

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

What is claimed is:

1. An artificial intelligence apparatus mounted in a water dispensing apparatus, the artificial intelligence apparatus comprising:
   a sensing interface configured to obtain weight data of a container;
   an input interface configured to obtain first speech data; and
   one or more processors configured to:
   determine, using the weight data, whether the container is seated on a seating portion of the water dispensing apparatus;
   adjust a speech recognition sensitivity according to whether the container is seated on the seating portion;
   input the first speech data to a speech recognition model; and
   allow the water dispensing apparatus to perform a first water dispensing operation corresponding to first water dispensing information in response to the speech recognition model outputting the first water dispensing information based on the first speech data,
   wherein the speech recognition sensitivity includes a reception sensitivity of a microphone for obtaining speech data and a frequency spectral similarity between obtained speech data and stored data of the speech recognition model,
   wherein the one or more processors are further configured to set the speech recognition sensitivity to a value higher than the speech recognition sensitivity in a case where the container is not seated on the seating portion based on determining that the container is seated on the seating portion.

2. The artificial intelligence apparatus of claim 1, wherein the one or more processors are further configured to determine that the container is seated on the seating portion based on the weight data being greater than or equal to a first value or an increase in the weight data within a preset period of time being greater than or equal to a second value.

3. The artificial intelligence apparatus of claim 2, wherein the one or more processors are further configured to, when a start word is obtained before the first speech data:
   allow the water dispensing apparatus to perform the first water dispensing operation corresponding to the first water dispensing information in response to the speech recognition model outputting the first water dispensing information based on the first speech data;
   obtain second water dispensing information by inputting second speech data into the speech recognition model or an artificial intelligence model; and
   allow the water dispensing apparatus to perform a second water dispensing operation according to the second water dispensing information.

4. The artificial intelligence apparatus of claim 2, wherein the one or more processors are further configured to set the speech recognition sensitivity to a value lower than the speech recognition sensitivity in a case where the container is seated on the seating portion or control the water dispensing apparatus not to perform a water dispensing function when it is determined that the container is not seated on the seating portion.

5. The artificial intelligence apparatus of claim 1, wherein the one or more processors are further configured to train an artificial intelligence model using, as an input value, at least one of the first speech data or the weight data and using, as a result value, the first water dispensing information output by the speech recognition model.

6. The artificial intelligence apparatus of claim 5, wherein the one or more processors are further configured to obtain second speech data spoken by a specific speaker through the input interface, obtain second water dispensing information corresponding to the specific speaker as a result value by inputting the second speech data into the trained artificial intelligence model, and allow the water dispensing apparatus to dispense water according to the second water dispensing information.

7. The artificial intelligence apparatus of claim 5, wherein the one or more processors are further configured to obtain second speech data spoken by a specific speaker through the input interface, obtain second weight data of a second container seated on the seating portion through the sensing interface, obtain second water dispensing information corresponding to the specific speaker and the second container as a result value by inputting the second speech data and the second weight data into the trained artificial intelligence model, and allow the water dispensing apparatus to dispense water according to the second water dispensing information.

8. The artificial intelligence apparatus of claim 5, wherein the one or more processors are further configured to obtain second water dispensing information corresponding to an instruction extracted from the second speech data and the second weight data as a result value by inputting the second speech data and the second weight data into the trained artificial intelligence model and allow the water dispensing apparatus to dispense water according to the second water dispensing information.

9. A method of operating an artificial intelligence apparatus mounted in a water dispensing apparatus, the method comprising:
   obtaining weight data of a container;
   determining, using the weight data, whether the container is seated on a seating portion of the water dispensing apparatus;
   adjusting a speech recognition sensitivity according to whether the container is seated on the seating portion;
   obtaining first speech data;
   inputting the first speech data to a speech recognition model; and
   allowing the water dispensing apparatus to perform a first water dispensing operation corresponding to first water dispensing information in response to the speech recognition model outputting the first water dispensing information based on the first speech data,
   wherein the speech recognition sensitivity includes a reception sensitivity of a microphone for obtaining speech data and a frequency spectral similarity between obtained speech data and stored data of the speech recognition model,
   wherein the adjusting of the speech recognition sensitivity includes setting the speech recognition sensitivity to a value higher than the speech recognition sensitivity in a case where the container is not seated on the seating portion based on determining that the container is seated on the seating portion.

10. The method of claim 9, wherein the determining of whether the container is seated on the seating portion includes determining that the container is seated on the seating portion based on the weight data being greater than or equal to a first value or an increase in the weight data within a preset period of time being greater than or equal to a second value.

11. The method of claim 10, further comprising:
when a start word is obtained before the first speech data:
allowing the water dispensing apparatus to perform the first water dispensing operation corresponding to the first water dispensing information in response to the speech recognition model outputting the first water dispensing information based on the first speech data;
obtaining second water dispensing information by inputting second speech data into the speech recognition model or an artificial intelligence model; and
allowing the water dispensing apparatus to perform a second water dispensing operation according to the second water dispensing information.

12. The method of claim 10, wherein the adjusting of the speech recognition sensitivity includes setting the speech recognition sensitivity to be lower than a preset value or controlling the water dispensing apparatus not to perform a water dispensing function when it is determined that the container is not seated on the seating portion.

13. The method of claim 9, further comprising:
training an artificial intelligence model using, as an input value, at least one of the first speech data or the weight data and using, as a result value, the first water dispensing information output by the speech recognition model.

14. The method of claim 13, further comprising:
obtaining second speech data spoken by a specific speaker through an input interface;
obtaining second water dispensing information corresponding to the specific speaker as a result value by inputting the second speech data into the trained artificial intelligence model; and
allowing the water dispensing apparatus to dispense water according to the second water dispensing information.

15. The method of claim 13, further comprising:
obtaining second speech data spoken by a specific speaker through an input interface;
obtaining second weight data of a second container seated on the seating portion through a sensing interface;
obtaining second water dispensing information corresponding to the specific speaker and the second container as a result value by inputting the second speech data and the second weight data into the trained artificial intelligence model; and
allowing the water dispensing apparatus to dispense water according to the second water dispensing information.

16. The method of claim 13, further comprising:
obtaining second water dispensing information corresponding to an instruction extracted from the second speech data and the second weight data as a result value by inputting the second speech data and the second weight data into the trained artificial intelligence model; and
allowing the water dispensing apparatus to dispense water according to the second water dispensing information.

* * * * *